United States Patent [19]

Mehia

[11] 3,777,129

[45] Dec. 4, 1973

[54] FAULT DETECTION AND LOCALIZATION IN DIGITAL SYSTEMS
[75] Inventor: Madhukumar A. Mehia, Addison, Ill.
[73] Assignee: GTE Automatic Electric Laboratories Incorporated, Northlake, Ill.
[22] Filed: May 22, 1972
[21] Appl. No.: 255,267

[52] U.S. Cl...... 235/151.3, 235/153 AC, 324/73 R, 324/73 PC, 324/133, 340/253 B, 340/255
[51] Int. Cl............................................ G01r 31/04
[58] Field of Search.................... 235/151.3, 151.31, 235/153 AC, 153 AK; 324/73 R, 73 AT, 73 PC, 133; 340/248 R, 253 R, 253 B, 255, 256; 444/1

[56] References Cited
UNITED STATES PATENTS
3,302,109   1/1967   Jones ................................ 324/73 R Primary Examiner—Felix D. Gruber
Assistant Examiner—R. Stephen Dildine, Jr.
Attorney—K. Mullerheim et al.

[57] ABSTRACT

A method for synthesizing a test function which can detect and isolate a fault to the single input of a multiple input circuit and means for utilizing the resulting function is disclosed. The test circuit is a function only of the number of inputs to the circuit under test and not a function, as is the usual case, of what the circuit under test is performing.

9 Claims, 18 Drawing Figures

| TEST NO. | TEST PROCEDURE ||||| OUTPUT Z |||||||||
|---|---|---|---|---|---|---|---|---|---|---|---|---|---|---|
| | $A_1$ | $A_2$ | $A_3$ | $A_4$ | NORMAL | $a_1^0$ | $a_1^1$ | $a_2^0$ | $a_2^1$ | $a_3^0$ | $a_3^1$ | $a_4^0$ | $a_4^1$ | $z^0$ | $z^1$ |
| 1 | | | | | $\sigma_1$ | | | | | | | | | 0 | 1 |
| 2 | | | | | $\sigma_2$ | | | | | | | | | 0 | 1 |
| 3 | | | | | $\sigma_3$ | | | | | | | | | 0 | 1 |
| 4 | | | | | $\sigma_4$ | | | | | | | | | 0 | 1 |

FIG. 3

| NUMBER OF INPUTS (n) | NUMBER OF TESTS IN THE OPTIMUM TEST PROCEDURE (P) |
|---|---|
| 2 | 3 |
| 3 THROUGH 6 | 4 |
| 7 THROUGH 14 | 5 |
| 15 THROUGH 30 | 6 |
| $(2^{P-2}-1)$ THROUGH $(2^{P-1}-2)$ | P |

FIG. 4

| NORMAL OUTPUT VECTOR |
|---|
| $\sigma_1$ |
| $\sigma_2$ |
| $\sigma_3$ |
| $\sigma_4$ |

CASE 1: $\sigma_1 = \sigma_2$
$\sigma_3 = \sigma_4 = \overline{\sigma_1}$

CASE 2: $\sigma_1 = \sigma_2 = \sigma_3$
$\sigma_4 = \overline{\sigma_1}$

| $\delta$ NUMBERS OF OUTPUTS WHICH ARE DIFFERENT FROM NORMAL | POSSIBLE OUTPUT VECTORS |
|---|---|
| 1 | $\overline{\sigma_1}$ $\sigma_1$ $\sigma_1$ $\sigma_1$ <br> $\sigma_2$ $\overline{\sigma_2}$ $\sigma_2$ $\sigma_2$ <br> $\sigma_3$ $\sigma_3$ $\overline{\sigma_3}$ $\sigma_3$ <br> $\sigma_4$ $\sigma_4$ $\sigma_4$ $\overline{\sigma_4}$ <br> (deleted in case 2) |
| 2 | $\overline{\sigma_1}$ $\overline{\sigma_1}$ $\overline{\sigma_1}$ $\sigma_1$ $\sigma_1$ $\sigma_1$ <br> $\overline{\sigma_2}$ $\sigma_2$ $\sigma_2$ $\overline{\sigma_2}$ $\overline{\sigma_2}$ $\sigma_2$ <br> $\sigma_3$ $\overline{\sigma_3}$ $\sigma_3$ $\overline{\sigma_3}$ $\sigma_3$ $\overline{\sigma_3}$ <br> $\sigma_4$ $\sigma_4$ $\overline{\sigma_4}$ $\sigma_4$ $\overline{\sigma_4}$ $\overline{\sigma_4}$ <br> (deleted in case 1)  (deleted in case 1) |
| 3 | $\sigma_1$ $\overline{\sigma_1}$ $\overline{\sigma_1}$ $\overline{\sigma_1}$ <br> $\overline{\sigma_2}$ $\sigma_2$ $\overline{\sigma_2}$ $\overline{\sigma_2}$ <br> $\overline{\sigma_3}$ $\overline{\sigma_3}$ $\sigma_3$ $\overline{\sigma_3}$ <br> $\overline{\sigma_4}$ $\overline{\sigma_4}$ $\overline{\sigma_4}$ $\sigma_4$ <br> (deleted in case 2) |
| 4 | $\overline{\sigma_1}$ <br> $\overline{\sigma_2}$ <br> $\overline{\sigma_3}$ <br> $\overline{\sigma_4}$ <br> (deleted in all cases) |

| TEST NO. | TEST PROCEDURE | | | | NORMAL | OUTPUT | | | | | | | | |
|---|---|---|---|---|---|---|---|---|---|---|---|---|---|---|
| | $A_1$ | $A_2$ | $A_3$ | $A_4$ | | $a_1^0$ δ=3 | $a_1^1$ δ=1 | $a_2^0$ δ=2 | $a_2^1$ δ=2 | $a_3^0$ δ=1 | $a_3^1$ δ=1 | $a_4^0$ δ=1 | $a_4^1$ δ=1 | $z^0$ | $z^1$ |
| 1 | | | | | $\sigma_1$ | $\sigma_1$ | $\overline{\sigma_1}$ | $\overline{\sigma_1}$ | $\overline{\sigma_1}$ | $\overline{\sigma_1}$ | $\overline{\sigma_1}$ | $\overline{\sigma_1}$ | $\overline{\sigma_1}$ | 0 | 1 |
| 2 | | | | | $\sigma_2$ | $\overline{\sigma_2}$ | $\sigma_2$ | $\sigma_2$ | $\overline{\sigma_2}$ | $\overline{\sigma_2}$ | $\overline{\sigma_2}$ | $\overline{\sigma_2}$ | $\sigma_2$ | 0 | 1 |
| 3 | | | | | $\sigma_3$ | $\overline{\sigma_3}$ | $\overline{\sigma_3}$ | $\overline{\sigma_3}$ | $\sigma_3$ | $\sigma_3$ | $\sigma_3$ | $\sigma_3$ | $\overline{\sigma_3}$ | 0 | 1 |
| 4 | | | | | $\sigma_4$ | $\overline{\sigma_4}$ | $\overline{\sigma_4}$ | $\overline{\sigma_4}$ | $\overline{\sigma_4}$ | $\sigma_4$ | $\sigma_4$ | $\sigma_4$ | $\sigma_4$ | 0 | 1 |

FIG. 8

| TEST NO. | TEST PROCEDURE | | | |
|---|---|---|---|---|
| | $A_1$ | $A_2$ | $A_3$ | $A_4$ |
| 1 | 1 | 1 | 0 | 1 |
| 2 | 1 | 0 | 1 | 0 |
| 3 | 1 | 1 | 0 | 1 |
| 4 | 0 | 0 | 1 | 1 |

| TEST | OUTPUT | | | CONDITIONS OF INPUT $A_K$ IN THE TEST $t_i$ |
|---|---|---|---|---|
| | NORMAL | $a_K^0$ | $a_K^1$ | |
| | | $\sigma_i$ | $\sigma_i$ | $A_K = -$ |
| $t_i$ | $\sigma_i$ | $\sigma_i$ | $\overline{\sigma_i}$ | $A_K = 0$ |
| | | $\overline{\sigma_i}$ | $\sigma_i$ | $A_K = 1$ |

FIG. 7

|  | $A_1A_2$ 00 | 01 | 11 | 10 |
|---|---|---|---|---|
| $A_3A_4$ 00 | $\overline{\sigma_i}$ | | $\sigma_i$ $\sigma_i$ | |
| 01 | $\overline{\sigma_i}$ | | $\sigma_i$ | $\overline{\sigma_i}$ |
| 11 | $\overline{\sigma_i}$ | | $\sigma_i$ $a_4^1$ $\overline{\sigma_i}$ | $\sigma_i$ |
| 10 | $\overline{\sigma_i}$ | $\sigma_i$ | $\overline{\sigma_i}$ | $\sigma_i$ $a_2^0$ $\overline{\sigma_i}$ |

FIG. 9

| | TEST PROCEDURE | | | | OUTPUT | | | | | | | | | |
|---|---|---|---|---|---|---|---|---|---|---|---|---|---|---|
| | | | | | | $\delta=1$ | $\delta=3$ | $\delta=1$ | $\delta=1$ | $\delta=1$ | $\delta=3$ | $\delta=2$ | $\delta=2$ | |
| TEST NO. | $A_1$ | $A_2$ | $A_3$ | $A_4$ | NORMAL | $a_1^0$ | $a_1^1$ | $a_2^0$ | $a_2^1$ | $a_3^0$ | $a_3^1$ | $a_4^0$ | $a_4^1$ | $z^0$ $z^1$ |
| 1 | 0 | 0 | 0 | 0 | $\sigma_1$ | $\sigma_1$ | $\overline{\sigma_1}$ | $\sigma_1$ | $\overline{\sigma_1}$ | $\sigma_1$ | $\overline{\sigma_1}$ | $\sigma_1$ | $\overline{\sigma_1}$ | 0 1 |
| 2 | 1 | – | 0 | 1 | $\sigma_2$ | $\overline{\sigma_2}$ | $\sigma_2$ | $\sigma_2$ | $\sigma_2$ | $\sigma_2$ | $\overline{\sigma_2}$ | $\overline{\sigma_2}$ | $\sigma_2$ | 0 1 |
| 3 | 0 | 1 | 0 | 0 | $\sigma_3$ | $\sigma_3$ | $\overline{\sigma_3}$ | $\overline{\sigma_3}$ | $\sigma_3$ | $\sigma_3$ | $\overline{\sigma_3}$ | $\sigma_3$ | $\overline{\sigma_3}$ | 0 1 |
| 4 | 0 | – | 1 | 1 | $\sigma_4$ | $\sigma_4$ | $\overline{\sigma_4}$ | $\sigma_4$ | $\sigma_4$ | $\overline{\sigma_4}$ | $\sigma_4$ | $\overline{\sigma_4}$ | $\sigma_4$ | 0 1 |

|  | $A_1A_2$ | | | |
|---|---|---|---|---|
| $A_3A_4$ | 00 | 01 | 11 | 10 |
| 00 | $\sigma_1$ (NORMAL) $\sigma_1 a_2^0$ | $\sigma_3=\overline{\sigma_1}$ (NORMAL) $\overline{\sigma_1} a_2^1$ | $\sigma_1 a_1^1$ | $\overline{\sigma_1} a_1^1$ $\overline{\sigma_1} a_4^0$ |
| 01 | $\overline{\sigma_1} a_4^1$ $\overline{\sigma_1} a_1^0$ | $\sigma_1 a_4^1$ $\sigma_1 a_3^0$ | | $\sigma_2=\sigma_1$(NORMAL) |
| 11 | | $\sigma_4=\overline{\sigma_1}$(NORMAL) | $\sigma_1 a_1^1$ | $\overline{\sigma_1} a_3^1$ |
| 10 | $\overline{\sigma_1} a_3^1$ | $\sigma_1 a_3^1$ $\sigma_1 a_4^0$ | | |

FIG. 12

|  | $A_1A_2$ | | | |
|---|---|---|---|---|
| $A_3A_4$ | 00 | 01 | 11 | 10 |
| 00 | 0 | 1 | 0 | 1 |
| 01 | 1 | 0 | 0 | 0 |
| 11 | 1 | 1 | 0 | 1 |
| 10 | 1 | 0 | (1) | (1) |

FIG. 13

| TEST PROCEDURE | | | | | OUTPUT | | | | | | | | | |
|---|---|---|---|---|---|---|---|---|---|---|---|---|---|---|
| TEST NO. | $A_1$ | $A_2$ | $A_3$ | $A_4$ | NORMAL | $a_1^0$ | $a_1^1$ | $a_2^0$ | $a_2^1$ | $a_3^0$ | $a_3^1$ | $a_4^0$ | $a_4^1$ | $Z^0$ | $Z^1$ |
| 1 | 0 | 0 | 0 | 0 | 0 | 0 | 1 | 0 | 1 | 0 | 1 | 0 | 1 | 0 | 1 |
| 2 | 1 | 0 | 0 | 1 | 0 | 1 | 0 | 0 | 0 | 0 | 1 | 1 | 0 | 0 | 1 |
| 3 | 0 | 1 | 0 | 0 | 1 | 1 | 0 | 0 | 1 | 1 | 0 | 1 | 0 | 0 | 1 |
| 4 | 0 | 1 | 1 | 1 | 1 | 1 | 0 | 1 | 1 | 0 | 1 | 0 | 1 | 0 | 1 |
|  |  |  |  |  | 12 | 14 | 1 | 8 | 13 | 4 | 11 | 6 | 9 | 0 | 15 |

FIG. 14

| GROUP 1 | | GROUP 2 | | GROUP 3 | | GROUP 4 | |
|---|---|---|---|---|---|---|---|
| THE FAULT $a_{K1}$ S-a-0 DISTINGUISHABLE FROM THE FAULT $a_{K2}$ S-a-0 | | THE FAULT $a_{K1}$ S-a-0 DISTINGUISHABLE FROM THE FAULT $a_{K2}$ S-a-1 | | THE FAULT $a_{K1}$ S-a-1 DISTINGUISHABLE FROM THE FAULT $a_{K2}$ S-a-0 | | THE FAULT $a_{K1}$ S-a-1 DISTINGUISHABLE FROM THE FAULT $a_{K2}$ S-a-1 | |
| $A_{K1}$ | $A_{K2}$ | $A_{K1}$ | $A_{K2}$ | $A_{K1}$ | $A_{K2}$ | $A_{K1}$ | $A_{K2}$ |
| 0 | 1 | 0 | 0 | 0 | 0 | 0 | 1 |
| 1 | 0 | 1 | 1 | 1 | 1 | 1 | 0 |
| 1 | — | — | 0 | 0 | — | 0 | — |
| — | 1 | 1 | — | — | 1 | — | 0 |

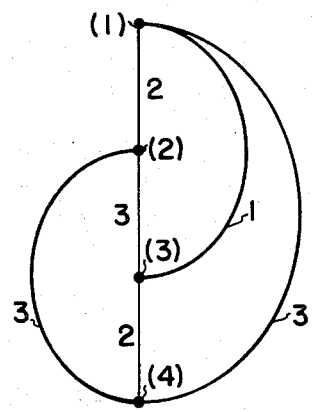

FIG. 15

|  |  | $\sigma_{K1} = \sigma_{K2}$ | | | $\sigma_{K1} = \overline{\sigma_{K2}}$ | | |
|---|---|---|---|---|---|---|---|
|  |  | INPUT CONDITION | | NORMAL OUTPUT | INPUT CONDITION | | NORMAL OUTPUT |
| POSSIBILITY | TEST | $A_i$ | $A_j$ |  | $A_i$ | $A_j$ |  |
| 1 | $t_{K1}$ | — | — | $\sigma_{K1}$ | — | — | $\sigma_{K1}$ |
|  | $t_{K2}$ | — | — | $\sigma_{K1}$ | $\alpha_i$ | $\alpha_j$ | $\overline{\sigma_{K1}}$ |
| 2 | $t_{K1}$ | — | $\overline{\alpha_j}$ | $\sigma_{K1}$ | — | $\overline{\alpha_j}$ | $\sigma_{K1}$ |
|  | $t_{K2}$ | $\alpha_i$ | — | $\sigma_{K1}$ | — | $\alpha_j$ | $\overline{\sigma_{K1}}$ |
| 3 | $t_{K1}$ | $\overline{\alpha_i}$ | — | $\sigma_{K1}$ | $\overline{\alpha_i}$ | — | $\sigma_{K1}$ |
|  | $t_{K2}$ | — | $\alpha_j$ | $\sigma_{K1}$ | $\alpha_i$ | — | $\overline{\sigma_{K1}}$ |
| 4 | $t_{K1}$ | $\overline{\alpha_i}$ | $\overline{\alpha_j}$ | $\sigma_{K1}$ | $\overline{\alpha_i}$ | $\overline{\alpha_j}$ | $\sigma_{K1}$ |
|  | $t_{K2}$ | $\alpha_i$ | $\alpha_j$ | $\sigma_{K1}$ | — | — | $\overline{\sigma_{K1}}$ |

*FIG. 16*

|  | $\sigma_{K1} = \sigma_{K2}$ | | $\sigma_{K1} = \overline{\sigma_{K2}}$ | |
|---|---|---|---|---|
| TEST | INPUT CONDITION $A_i$ | NORMAL OUTPUT | INPUT CONDITION $A_i$ | NORMAL OUTPUT |
| $t_{K1}$ | — | $\sigma_{K1}$ | $\overline{\alpha_i}$ | $\sigma_{K1}$ |
| $t_{K2}$ | — | $\sigma_{K1}$ | $\alpha_i$ | $\overline{\sigma_{K1}}$ |

FAULT DETECTION AND LOCALIZATION IN DIGITAL SYSTEMS

BACKGROUND OF THE INVENTION

1. Field of the Invention

This invention relates to fault localization in a digital system, and more particularly to isolating a fault to a single input of a multiple input circuit.

2. Description of the Prior Art

The earlier approaches to fault diagnosis included the use of special test instruments such as voltmeters and oscilloscopes to aid the manual diagnosis of the system. As systems grew in size and complexity, this approach obviously became less and less practical.

Then came the use of diagnostic programs for fault diagnosis. The earliest programs were written to exercise machine functions, rather than the hardware. The general approach was to execute a complex machine instruction (such as MULTIPLY) using pseudo random operands. The results were then compared with those obtained by using an equivalent sequence of a simpler instructions (for example, ADD and SHIFT) with the same operands. If the results agreed, the complex instruction was assumed to be operative and if otherwise, it was assumed to be defective. This approach did not provide a complete test, and could even result in erroneous diagnosis if the instructions used in the two calculations were not hardware disjoint.

A major improvement in the area of fault diagnosis lay in the testing of hardware rather than functions, starting with an article written by R. D. Eldred entitled "Test Routines Based on Symbolic Logic Statements," which appeared in the Journal of ACM, 6/1/1959, pages 33 through 36. Subsequently, hardware oriented diagnostics came into general use and are still used today. The approach is based on the concept of knowledge of the predominant failure modes and the performance of the component under failure conditions. Many failures of digital circuits, it was observed, create "stuck-at-high," or "stuck-at-low" conditions. These faults are collectively called logical faults. Most of the available techniques for analyzing systems behavior under failure assume logical faults. Intermittent (time-varying) faults are typically not considered. Also usually the assumption of a single failure at a time is made, the rationale behind the assumption is that if the testing is done frequently enough the first fault will be detected before a second fault can occur.

The notion of a test is central to the area of hardware-oriented diagnostics. A test consists of a predetermined set of input conditions which are to be applied to the system and the resulting performance of the system is observed. A set of tests for a system is collectively called a test procedure or a test pattern and the points at which the performance of the system is observed are called observable points.

The purpose of testing may be twofold: one, to detect the presence of the fault and the other to determine the location of the fault. Conventionally, test procedures are primarily designed to detect the faults. The resulting extent of failure localization is then examined. Additional tests and/or additional observable points are introduced if the available degree of fault localization is not adequate.

SUMMARY OF THE INVENTION

One of the objects of the present invention is to provide a method and means for isolating a fault to a single input of a multiple input circuit under test. This is accomplished by utilizing a test circuit having a single observable output, applying a predetermined test pattern to the circuit under test and observing the single output from the test circuit.

Another object of the present invention is to establish a test procedure which utilizes a minimum number of tests in order to isolate a fault to a single input of the circuit under test.

Another object of the present invention is to synthesize a function for testing a circuit having any number of inputs, this function resulting in a relatively simple circuit that may be incorporated into an integrated circuit chip and which requires that only one additional output be added to the circuit chip.

BRIEF DESCRIPTION OF THE DRAWING

FIG. 3 is a partially completed fault table used to develop a function for testing a four input circuit.

FIG. 4 is a table illustrating the number of tests P in an optimum test pattern for an n input circuit.

FIG. 5 is a table of possible output vectors which differ from the normal output vector, said table being useful in synthesizing a function for testing a four input circuit.

FIG. 6 is a partially completed fault table illustrating one selection from the table of FIG. 5, of output vector pairs for possible input faults.

FIG. 7 is a table used in ascertaining the input condition for the various combinations of output vector pairs for the possible input faults.

FIG. 8 illustrates the test procedure derived from the output vector pairs for the various input faults for the fault table of FIG. 6.

FIG. 9 is a partially completed Karnaugh map for the test procedure of FIG. 8.

FIG. 10 is a fault table for a four input circuit illustrating a pairing of output vectors for the various input faults.

FIG. 11 is a Karnaugh map of the test procedure of FIG. 10.

FIG. 12 is a Karnaugh map, in terms of logic ones and zeros, for the test procedures of FIG. 10 for $\sigma_1 = 0$.

FIG. 13 is the fault table of FIG. 10 completed in terms of logic ones and zeros under the selection of $\sigma_1 = 0$.

FIG. 14 illustrates a table useful in determining if a first vector is separable from a second.

FIG. 15 is the distance diagram for the test procedure of FIG. 13.

FIG. 16 illustrates a table used in conjunction with the distance diagram of a test procedure to analyze the significance of a distance equal to two in the distance diagram.

FIG. 17 illustrates a table used in conjunction with a distance equal to one in the distance diagram of a test procedure to analyze the significance of that distance in terms of verifying that a testing function for that particular test procedure exists.

DESCRIPTION OF THE PREFERRED EMBODIMENT

Before beginning the description of the test circuit and method for synthesizing the test circuit, it is necessary that certain basic assumptions and definitions be set out. Under the testing scheme set forth herein, it is assumed that the testing is done at a sufficiently fast rate such that only one failure at a time will be encountered, i.e., the testing will be done at a sufficiently fast rate such that when one failure is encountered the faulty unit will be replaced before a second failure can occur. Since it is further assumed that only the inputs and outputs of the circuit under test can fail, the special test functions developed herein are designed to detect and locate failures at only the inputs and outputs of the circuit under test. The required degree of fault localization is closely related to the concept of least replaceable unit hereinafter also referred to as an LRU. An LRU is the smallest subsystem that will be completely replaced if a fault is located to that subsystem. In systems implemented with discrete components, LRU's may be a subsystem, a card or even a discrete component. In systems implemented with integrated circuits, least replaceable units may be individual chips; and in the case of LSI implemented systems, least replaceable units are likely to be chips containing hundreds of gates. The concept of least replaceable unit is important because it determines the required level of diagnostic resolution.

Since it has been observed that many failures in digital circuits result in a stuck-at-high or stuck-at-low condition, the diagnosis of input and output faults is based on one or the other of these conditions occurring at the inputs or outputs of the LRU. The stuck-at-high fault, which will be abbreviated herein as $s$-$a$-1, indicates that the input or output lead is in an open circuit condition. The stuck-at-low condition, which will be abbreviated by a $s$-$a$-0, indicates that the lead in question is at ground potential.

Figure 1:
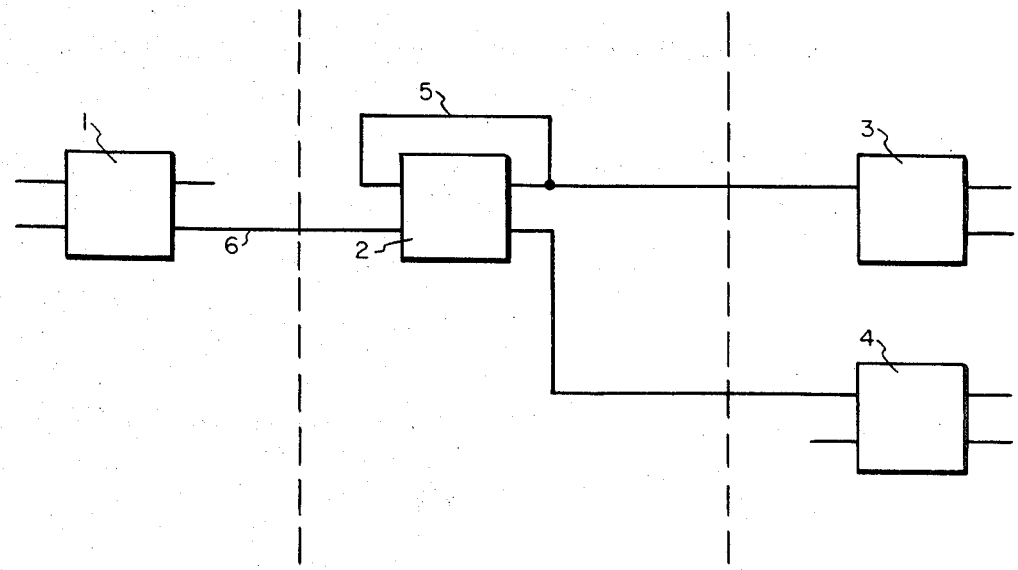
FIG. 1 is a block diagram of a multiple circuit arrangement useful in defining terminology used herein.

In addition to the aforementioned assumptions, fault localization described herein also assumes that the inputs are independent and that there are no internal inputs. For the development of test logic the principal concern is with the use of combinational logic as opposed to sequential logic. As used herein, an internal input is one which is driven by an output of the same least replaceable unit. For example, referring to FIG. 1 there is shown a series of least replaceable units designated by the numerals 1, 2, 3 and 4 and it can be seen that lead 5 provides an internal input from the output of least replaceable unit 2. Under the testing method described herein, it is necessary that all of the inputs to a least replaceable unit be controllable by the use of a test pattern and an internal input may not meet this requirement. Lead 6, which provides an input to least replaceable unit 2 from least replaceable unit 1, is designated for the purposes herein as an external input, which is more specifically defined as an input of a LRU which is driven by the output of another LRU. During a testing sequence it may be necessary to change the logic state of a single input without affecting other inputs to the LRU and for this reason it is necessary that the inputs to the LRU be independent. Two inputs are independent if, and only if, the logic state of either can be changed without affecting the logic state of the other.

Figure 2:
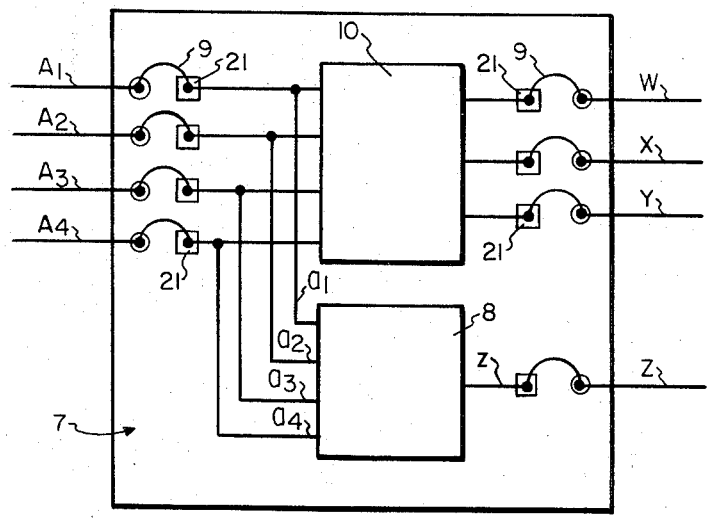
FIG. 2 is a block diagram representation of an integrated circuit assembly incorporating a testing circuit described herein.

Turning now to FIG. 2, there is shown a least replaceable unit designated 7, which for example might be an integrated circuit assembly, which has the external leads coming in designated $A_1$, $A_2$, $A_3$ and $A_4$. The outputs of integrated circuit assembly 7 are designated W, X and Y. It will be noted that the external inputs and outputs of integrated circuit assembly 7 are connected to the integrated circuit chip 10 by bonding leads 9. Bonding leads have been found to be a major cause of circuit failure and therefore one concern is with determining which, if any of these, might be causing defective circuit operation. The testing scheme described herein includes adding to the LRU to be tested, in this instance integrated circuit assembly 7, a test circuit 8 which is used to detect a $s$-$a$-1 or $s$-$a$-0 condition on any of the inputs to integrated circuit chip 10.

BY applying an appropriate test pattern to external inputs $A_1$ through $A_4$, and observing the output Z from testing circuit 8, it is possible to determine if any of the inputs or the output Z may be $s$-$a$-0 or $s$-$a$-1 and if one is, identify the faulty lead. It should be noted that the connections to testing circuit 8 and the inputs to integrated circuit chip 10 from bonding pads 21 are via metallizations, which do not include the bonding leads 9, and therefore are less susceptible to failures. In this testing arrangement it will be appreciated that not only is it possible that inputs $A_1$ through $A_4$ might be either $s$-$a$-1 or $s$-$a$-0, but in addition thereto it is conceivable that the single observable output Z could have a bonding failure which could give an output of $s$-$a$-1 or $s$-$a$-0. In the development of this testing scheme a shorthand method of describing $s$-$a$-1 and $s$-$a$-0 faults is employed and as an example, $a_1{}^0$ is used to designate that lead $a_1$ is in a $s$-$a$-0 condition. In a similar manner, to designate the condition of lead $a_1$ being stuck at 1, the notation of $a_1{}^1$ is used.

The goal is to synthesize a test function which permits fault detection and isolation of a fault to a single lead by observing the one output from the testing circuit. To achieve this, a binary test pattern must be generated which, when applied to the inputs in question, will detect a fault and isolate it to the single lead. Once this binary test pattern is generated the function which will perform the required isolation can be written and from this function one can construct the circuitry required for fault isolation.

Now referring to FIG. 3, there is shown a partially completed fault table used to generate the function for testing a four input circuit. On the left-hand side of the fault table there is a column headed Test Number, under which the numbers 1 through 4 appear, and to the right thereof, a section entitled Test Pattern, into which will be placed the binary inputs for $A_1$ through $A_4$ for each of the four tests. The right hand portion of the fault table is devoted to the resulting output vectors for the normal case and each of the possible fault cases which could be encountered. As used herein, the term vector refers to the column of information in question, for example, the normal output vector in FIG. 3 is $\sigma_1$, $\sigma_2$, $\sigma_3$ and $\sigma_4$.

In the situation where the output Z is stuck at either 0 or 1, the resulting output for each of the tests will be 0 or 1 regardless of the test pattern which is applied, and therefore the outputs will be all zeros or all ones for the respective $s$-$a$-0 or $s$-$a$-1 situations. In the column for the normal outputs for the tests there has been placed $\sigma_1$ through $\sigma_4$, since at this stage of function synthesis it cannot be established what combinations of ones and zeros would result if there were no faults in the circuit under test. For each test a one or a zero is simultaneously applied to each of the inputs $A_1$ through $A_4$ and the resulting output is stored. After the complete test pattern has been applied, the resulting output vectors will indicate whether or not there is a fault, and if a fault is present the location and nature of the fault, i.e., which input or the output of the testing circuit is either $s$-$a$-0 or $s$-$a$-1.

The length of the testing sequence often influences not only the time required for diagnosis but also the memory requirements of the diagnostic programs. Thus it is desirable in many instances to test the circuit using as few tests as possible, although this will generally complicate the testing circuit. Although the fault table of FIG. 3 has four tests which are necessary to localize the possible faults, there is not necessarily a one-to-one correspondence between the number of inputs to the circuit under test and the number of tests which must be run in order to localize the fault. For a n-input testing function, using the assumption that $s$-$a$-0 and $s$-$a$-1 failures at the inputs and at the outputs, the total number of possible failures is $2(n+1)$. It is desirable to distinguish these failures from each other, and also from the normal case. Therefore, the total number of different output vectors necessary is $(2n+3)$. Also since a single test point is being observed and the outcome of the tests are binary, the total number of possible output vectors for $p$ tests is $2^p$. Thus the required number of tests $p$ for an n-input testing function is given by the equation $2^p \geq 2n+3$, where $p$ is an integer.

A test pattern with $p$ tests will be defined as optimum if $2^{(p-1)} < 2n+3$ and if the test pattern meets the criteria which will be pointed out subsequently. The table of FIG. 4 illustrates the number of tests in the optimum test pattern ($p$) for various values of $n$. Although a minimum number of tests may be desirable, by increasing the number of tests a less complex function requiring fewer gates may result.

Since it is known that for a 4-input function the number of tests in the optimum test pattern is four, one may now proceed to establish the output vectors for the various failures from which the necessary test pattern can be derived. Once the proper test pattern has been generated, then it is possible to determine the test function from which the circuitry may be derived which will isolate the faults to a single input.

It will be recalled that in the partially completed fault table of FIG. 3, it was assumed that the normal output would be $\sigma_1$, $\sigma_2$, $\sigma_3$, and $\sigma_4$. For each of the faults on leads $a_1$ through $a_4$ there will be generated by the proper test pattern a distinctive output vector which will identify the fault. With a normal output vector of $\sigma_1$ through $\sigma_4$ there are fifteen possible different variations from the normal output vector which may be divided into four groups depending upon the number of outputs which are different from the normal output vector. This range of output possibilities is shown in FIG. 5. The problem of finding a four-input testing function, when translated in terms of FIG. 3, is to select one of the fifteen vectors of FIG. 5 for each fault in such a way that a function could produce the selected output vectors. The sequential steps to be followed are:

1. Select the permissible output vector for the normal case.
2. Select the permissible output vectors for the input failures.
3. Derive the input conditions for the tests in the test procedure.
4. Find the function.

There is no assurance that, if one follows steps 1, 2 and 3 a testing function will exist. However, if a testing function in step 4 does exist, then it will be an optimal testing function if the other steps are properly followed.

The first task is to select the permissible output vector for the normal case. Of the sixteen possible output vectors, two are already taken up for the output faults, i.e. all of the outputs true or all of the outputs false. The remaining output vectors then must have at least one logic 1 and one logic 0 outcome. Having eliminated the possibility of the normal output vector being all 1's or all 0's, then one has two remaining possibilities: Case 1, $\sigma_1 = \sigma_2$ and $\sigma_3 = \sigma_4 = \overline{\sigma_1}$; and Case 2, $\sigma_1 = \sigma_2 = \sigma_3$ and $\sigma_4 = \overline{\sigma_1}$, which may be restated as two alike or three alike. In case 1, the output vectors $\overline{\sigma_1}\ \overline{\sigma_2}\ \sigma_3\ \sigma_4$ will be identical to either the all 0's or the all 1's case depending on the value of $\sigma_1$. Similarly, the output vector $\sigma_1\ \sigma_2\ \overline{\sigma_3}\ \overline{\sigma_4}$ will also be identical to either the all 0's or the all 1's case. While in case 2, the output vectors $\overline{\sigma_1}\ \overline{\sigma_2}\ \overline{\sigma_3}\ \sigma_4$ and $\sigma_1\ \sigma_2\ \sigma_3\ \overline{\sigma_4}$ will be identical to either the all 0's or the all 1's case. Since the output faults produce the all 0's and the all 1's output vectors, the immediately preceding output vectors are to be eliminated from the set of possible output vectors for the input faults in the respective cases. The output vectors which must be eliminated for these two cases are shown in FIG. 5.

Next, select the permissible output vectors for the input failures. Referring to FIG. 5 for the selection of the possible output vectors for the various input faults, and keeping in mind that depending upon the nature of the normal output vector, that is whether the case 1 or case 2 normal output vector has been selected, it will be noted that certain of the possible output vectors will be deleted as indicated. However, before going about the task of selecting the output vectors for the various input faults, there is one additional possible output vector which must be eliminated, the output vector $\overline{\sigma_1}\ \overline{\sigma_2}\ \overline{\sigma_3}$ and $\overline{\sigma_4}$. Note that this vector is the complement of the normal output vector. This output vector cannot be used for any fault if the complementary failures can exist at all points, so this output vector must be eliminated from the list of the permissible vectors. Note that this is true for both the case 1 and case 2 normal output vector, and accordingly FIG. 5 shows that this output vector is to be deleted in all cases. The number of remaining output vectors for various values of $\delta$ for each of the cases is shown in FIG. 5, and note that the total number of permissible output vectors is equal to twelve for either case 1 or case 2 selection of the normal output vector.

The selection of output vectors, from among the twelve remaining output vectors, for the input faults is done in pairs, after first selecting which case to utilize, since for each case certain output vectors are not permissible. For purposes of illustration, the normal output vector corresponding to case 1 has been selected, i.e., $\sigma_1 = \sigma_2$ and $\sigma_3 = \sigma_4 = \overline{\sigma_1}$. In selecting the permissible output vectors for the input failures, there are available four output vectors in each of the groups for $\delta = $ 1, $\delta = 2$ and $\delta = 3$ as shown in FIG. 5. Since there are four inputs, each having complementary failures, four permissible pairs must be selected. By permissible pair it is meant that for each test in the pair, both outputs cannot be non-normal. As the total number of permissible output vectors (equal to 12) is greater than the number of output vectors required for the input faults (equal to 8), options in pairing exist. From these options an arbitrary choice has been made and FIG. 6 is obtained by substituting these output vectors into FIG. 3. The pairs chosen were a $\delta = 3, \delta = 1$ pair for the input faults at $a_1$; a $\delta = 2, \delta = 2$ pair for the inputs faults at $a_2$; a $\delta = 2, \delta = 1$ pair for the input faults at $a_3$; and a $\delta = 1, \delta = 1$ pair for the input faults at the input $a_4$ as shown in FIG. 6.

Next the required input conditions for each test in the test procedure must be derived. In deriving the test procedure from the pairs of output vectors corresponding to the possible faults at the $a_1$ through $a_4$ inputs, reference will be had to the table in FIG. 7. The far right-hand column of FIG. 7 includes the various inputs for the corresponding pairs of faults for $a_k{}^0$ and $a_k{}^1$. In addition to the 1 or 0 input conditions, it should be noted that there is a dash input designation for the input in the case where the output fault pair is equal to $\sigma_i \sigma_i$. In the $\sigma_i \sigma_i$ pair the resulting input condition of the $A_k = ...,$ may be chosen either a 1 or a 0 for that test input, and therefore the $A_k = \phantom{xx}$ case has been designated as meaning the test input is fault insensitive. The test procedure of FIG. 8 was derived from the output vector pairs for the various faults of FIG. 6 by using the table of FIG. 7. For example the $a_1{}^0$, $a_1{}^1$ pair of $\overline{\sigma_1} \sigma_1$, when referred to FIG. 7 gives the result of $A_k = 1$, and therefore the input to $A_1$ in test 1 will be a 1 as shown in FIG. 8. In a like manner the second output fault pair of the $a_2{}^0$ $a_2{}^1$ which is again $\overline{\sigma_1} \sigma_1$ likewise gives a 1 result when referred to FIG. 7, and therefore the input to $A_2$ in test 1 is a 1. The remaining portion of the test procedure of FIG. 8 was derived by following the same procedure as outlined for the inputs $A_1$ and $A_2$ for the test number 1.

Having completed the first three steps in finding a four-input testing function, the fourth step of finding the function, if one indeed exists for this test procedure, remains. A Karnaugh map is used to define the function for this test procedure. The Karnaugh map concept is quite old and was described in an article by M. Karnaugh entitled "The Map Method for Synthesis of COmbinational Logic Circuits" which appeared in the AIEE Transaction, Part 1: Communications and Electronics, Vol. 72, Nov. 1953, on pages 593 through 599, and therefore further explanation of this concept is not here deemed necessary. The function will be defined by substituting the desired outputs, in terms of $\sigma_1$ for the various input combinations of the inputs $A_i$'s, keeping in mind that the case 1 situation was chosen, as previously mentioned.

FIG. 9 is a partially completed Karnaugh map for the test procedure of FIG. 8, this partial completion being performed as described subsequently. First, consider the normal case. For the first test in the test procedure of FIG. 8, the normal outcome is $\sigma_1$. The input cpmbination for test 1 has $A_1$, $A_2$ and $A_3$ at logic 1, 1 and 0, respectively, while the logic condition at the input $A_4$ may be a 1 or a 0 since input $A_4$ is fault insensitive for this test. Therefore, for the input combinations $A_1A_2A_3A_4 = 1100$ and $A_1A_2A_3A_4 = 1101$, the output of the function has to be $\sigma_1$. These entries have been made in the Karnaugh map of FIG. 9. Similarly, for the second test with the input combination $A_1A_2A_3A_4 = 1011$, the function must produce a normal outcome of $\sigma_2$ which is equal to $\sigma_1$. Therefore, the Karnaugh map of FIG. 9 shows the output corresponding to the input combination $A_1A_2A_3A_4 = 1011$, as $\sigma_1$. Further, the third test requires that for the input combination $A_1A_2A_3A_4 = 1110$, the normal output of the function should be $\sigma_3$ which is equal to $\overline{\sigma_1}$. Therefore, the entry of the input conditions $A_1A_2A_3A_4 = 1110$ in the Karnaugh map of FIG. 9 is $\overline{\sigma_1}$. Finally, the fourth test requires that the normal output of $\sigma_4$, which is $\overline{\sigma_1}$ in the case at hand, should result if $A_1A_2 = 00$ regardless of the input conditions at the inputs $A_3$ or $A_4$. The entries in the Karnaugh map for $A_1A_2A_3A_4 = 0000, A_1A_2A_3A_4 = 0001, A_1A_2A_3A_4 = 0010$ and $A_1A_2A_3A_4 = 0011$, therefore, show the output of the desired function as $\overline{\sigma_1}$.

Now the various failures and the required output vectors for them will be considered. First, the second test will be considered since it does not have any fault insensitive inputs. The input combiniation $A_1A_2A_3A_4 = 1011$ produces a normal output of $\sigma_2 (= \sigma_1)$. Now consider a $s$-$a$-0 failure at the input $a_1$. According to the assignment in FIG. 6, under the input $a_1$ $s$-$a$-0 failure, the output for the second test should be $\sigma_2 (= \overline{\sigma_1})$. But with this fault, the input conditions to the circuit are as though the input combination was $A_1A_2A_3A_4 = 0011$. Therefore, the entry corresponding to $A_1A_2A_3A_4 = 0011$ has to be equal to $\overline{\sigma_1}$. Fortunately, this was so. Similarly, consideration of the $s$-$a$-1 fault at the input $a_2$ and $s$-$a$-0 fault at the inputs $a_3$ and $a_4$ require that the function produce an output of $\overline{\sigma_1}$ for the input combinations $A_1A_2A_3A_4 = 1111$, $A_1A_2A_3A_4 = 1001$ and $A_1A_2A_3A_4 = 1010$, respectively. These entries are also shown in FIG. 9.

Now considering the third test, the required outputs for the various fault conditions for this test are shown in FIG. 9, which were derived by similar considerations. Note that consideration of performance under failures for the second test requires that the output of the function for the input condition $A_1A_2A_3A_4 = 1111$ or $A_1A_2A_3A_4 = 1010$ be $\overline{\sigma_1}$, while the consideration of the third test under failures requires that the output of the function for $a_4$ $s$-$a$-1, which would yield a 1111, and $a_2$ $s$-$a$-0, yielding 1010, requires that the output of the function be $\sigma_1$. Although the function could be defined to provide one or the other output for any input combination, it cannot provide both outputs. Situations of this kind pose a problem which will be called a conflict. Due to the existence of the conflict, a function with a fault table as shown in FIG. 6 and a test pattern as shown in FIG. 8 do not exist. Thus it can be seen that by plotting the outputs in terms of $\sigma$ on a Karnaugh map for the normal case and for the various fault cases, it is possible to determine whether or not a function exists which will perform the required testing.

Once a conflict occurs in the Karnaugh map plot, then it is evident that a function does not exist for the output pairing selected, and therefore it will be necessary to again select a different set of output vector pairs for the various input faults.

Since the assignment of pairs of output vectors in FIG. 6 was arbitrary, and as options exist in pairing, there are other assignments for which a function may exist. In the fault table of FIG. 10, there is shown a different selection of output vector pairs for the various input faults, and the corresponding test procedure which was completed through the use of the translation table of FIG. 7 as was done previously. The output vector for the normal case is retained as in the previous example, i.e. $\sigma_1 = \sigma_2$, $\sigma_3 = \sigma_4 = \overline{\sigma_1}$.

Next it must be determined if the desired function exists, which can be done by plotting on a Karnaugh map the outputs in terms of $\sigma_1$ for the normal case and for the input fault cases for the various input failures. The Karnaugh map of FIG. 11 shows the normal outputs of the function for various input combinations as required by the test procedure of FIG. 10, these normal outputs being parenthetically designated "normal" in FIG. 11. Next, the required output of the function for various fault conditions must be considered. For the first test a s-a-1 failure at any input shuld result in a different from normal output (as shown in the assignment of FIG. 10). This means for the input combinations $A_1A_2A_3A_4 = 0001$, $A_1A_2A_3A_4 = 0010$, $A_1A_2A_3A_4 = 0100$ and $A_1A_2A_3A_4 = 1000$, the function should produce an output of $\overline{\sigma_1}$, these entries being shown in FIG. 11 with the shorthand designation for the fault appearing adjacent thereto. Note that so far no conflicts have occurred.

Proceeding to the second test of the test procedure, note that the conditions for the input $A_2$ for the second test is not defined. Also, it is known that the output of the circuit for a s-a-0 failure at the input $a_1$, or a s-a-1 failure at the input $a_3$ or a s-a-0 failure at the input $a_4$ should result in a different from normal output ($\overline{\sigma_2} = \overline{\sigma_1}$) for the second test. If the input condition at $A_2$ for the second test is chosen to be a logic 0, then for the three above-mentioned failures the input combination for the second test will appear to be $A_1A_2A_3A_4 = 0001$, $A_1A_2A_3A_4 = 1011$ and $A_1A_2A_3A_4 = 1000$, respectively. If instead, a logic 1 input condition was chosen for $A_2$ for the second test, then for the three above-mentioned failures the input combination for the second test would appear to be $A_1A_2A_3A_4 = 0101$, $A_1A_2A_3A_4 = 1111$ and $A_1A_2A_3A_4 = 1100$, respectively. Although either choice is permissible here, in cases of conflict the existence of an option can provide a useful alternative. In the present case the choice is arbitrary. If the input $A_2$ is chosen to be logic 0, the three corresponding entries are as shown in the Karnaugh map of FIG. 11. Note that although the entries for the input combinations $A_1A_2A_3A_4 = 0001$ and $A_1A_2A_3A_4 = 1000$ are defined twice, there is no conflict.

In the third test, the s-a-0 failure at the input $a_2$ and s-a-1 failures at the inputs $a_1$, $a_3$ and $a_4$ produce a different from normal performance ($\overline{\sigma_3} = \sigma_1$). As can be seen from FIG. 11, entries corresponding to this test in a Karnaugh map result in no conflicts.

In the fourth test, a fault insensitive input condition exists for the input $A_2$. Also it will be noted that the s-a-1 failure at the input $a_1$ and the s-a-0 failures at the inputs $a_3$ and $a_4$ produce a different from normal output for the fourth test ($\overline{\sigma_4} = \sigma_1$). If the input condition at the input $A_2$ is chosen to be logic 0, then for the above-mentioned faults the input combinations of the fourth test will appear to be $A_1A_2A_3A_4 = 1011$, $A_1A_2A_3A_4 = 0001$ and $A_1A_2A_3A_4 = 0010$, respectively; and therefore, the required output of the function for these input combinations would be $\sigma_1$. Note however that each of these combinations in FIG. 11 have the output $\overline{\sigma_1}$ due to the consideration of other tests. Thus, selection of a logic 0 input condition at $A_2$ for the fourth test results in a conflict. A selection of a logic 1 condition at $A_2$ instead, resolves the conflict as can be seen from the corresponding entries in the Karnaugh map of FIG. 11.

Note that since there are no conflicts the testing function exists. So far the value of $\sigma_1$ has not been defined. A function with the required properties exists for either value of $\sigma_1$ (logic 0 or 1). For the sake of illustration, $\sigma_1$ has been selected to be logic 0, and FIG. 12 shows the map of the required function. The outputs for the input combinations $A_1$, $A_2$, $A_3$ and $A_4$ equal to 1010 and $A_1$, $A_2$, $A_3$ and $A_4$ equal to 1110 are not defined in the Karnaugh map of FIG. 12, so for the purposes of the test, they may be selected either a logic 1 or a logic . for these outputs. To minimize the complexity of the resulting function, the outputs for these two combinations were selected to be logic 1's. The resulting function derived from the Karnaugh map of FIG. 12 under well-known principles, is $F(A_1, A_2, A_3, A_4) = \overline{A_2}A_3 + \overline{A_1}A_3A_4 + \overline{A_1}\overline{A_2}A_4 + \overline{A_1}A_2\overline{A_3}\overline{A_4} + A_1\overline{A_2}A_4$.

FIG. 13 shows the complete fault table for the testing function under the previously mentioned choice of $\sigma_1$ equal to logic 0. In FIG. 13 it will be observed that below each output vector column there appears a number which is the decimal equivalent of the resulting output vector binary number. This decimal equivalent results from treating the output column as a string of 1's and 0's, with the outcome of the first test being considered as a least significant bit. Since each output vector provides a unique decimal equivalent, by storing the outputs of the tests, the condition of the circuit can readily be obtained by observing the resulting decimal equivalent.

In the foregoing synthesis of the testing function for a four input circuit the function was obtained by selecting permissible output vector pairs and then from these permissible pairs deriving a test procedure which was checked by using a Karnaugh map. It is possible, under a synthesis procedure which will be outlined subsequently, to write the normal output vector, the input vectors, and then determine if the function exists without plotting a Karnaugh map. The task of selecting the output vector pairs as done previously is also eliminated since the normal output vector and input vectors are selected arbitrarily, although certain restraints must be observed. Once it has been verified that the test procedure and the normal output vector selected will satisfy the testing requirements, the output vectors for the various input faults can be written.

The analysis of a test procedure to determine whether or not it will result in a function which will meet the testing requirements may be briefly outlined as follows:

1. The output vector for the normal case must have at least one logic 0 and one logic 1;

2. Each input vector must have at least one logic 0 and one logic 1;

3. Each input vector must be separable from the normal output vector;

4. Each input vector must be separable from every other input vector; and

5. A Karnaugh map without a conflict or a distance diagram meeting predetermined criteria must exist.

Before demonstrating the use of the above tests for checking a test procedure, the concept of separable vectors must be defined and the distance diagram explained.

Two vectors will be termed separable if, and only if, the testwise condition pairs for these vectors have one pair from each of the four groupings of FIG. 14. To demonstrate the method of checking separability for the input vectors, refer to the test procedure of FIG. 13. To determine whether input vector $A_1$ is separable from input vector $A_2$, for example, look at the testwise condition pairs which are: for test 1, 00, for test 2, 10, for test 3, 01, and for test 4, 01. Taking the testwise condition pair for test 1, which is 00 and referring to the table of FIG. 14 note that the 00 pair occurs in Groups 2 and 3, thus two of the four necessary groups have been utilized. Thus to determine that vector $A_1$ is separable from vector $A_2$ a testwise condition pair must be also found in Groups 1 and 4. The testwise condition pair for test 3 is 01 and it will be noted that in FIG. 14 the testwise condition pair 01 occurs in Groups 1 and 4. Thus having found a testwise condition pair in each of the four groups of FIG. 14, then input vector $A_1$ is separable from input vector $A_2$.

By following a similar procedure it can be seen that each individual input vector $A_1$ through $A_4$ is separable from each of the other input vectors. In FIG. 13 the two fault insensitive input indicators for input vector $A_2$ have been retained in the test procedure at the inputs in test 2 and test 4 since these are necessary for ascertaining separability from the normal output vector. By showing that each input vector is separable from every other input vector in the test procedure, the fourth requirement set forth above has been met.

It can easily be seen that the first and second above mentioned requirements, that the output vector for the normal case has one logic 0 and one logic 1 and each input vector has one logic 0 and one logic 1 respectively, is met by the test procedure and normal output vector as shown in FIG. 13. Therefore requirements 1, 2 and 4 are met by the test procedure and normal output vector of FIG. 13. The third above-mentioned requirement, that each input vector be separable from the normal output vector, may be checked in the manner used to demonstrate that each of the input vectors is separable from each of the other input vectors. However, in finding separability between the normal output vector and input vector $A_2$ it is necessary to utilize the fault insensitive inputs in vector $A_2$. In checking that input vector $A_2$ is separable from the normal output vector, it will be noted that in test 1 the testwise condition pair 00 is found in groups 2 and 3 of FIG. 14, testwise conditioned pairs falling in groups 1 and 4 must be found. In group 4 of FIG. 14 note that the pair _0 appears and also that testwise condition pair for test 2 is _0, therefore a testwise condition pair for group 4 exists. In group 1, note that the pair _1 occurs and that this testwise condition pair also occurs in test 4. Without these fault insensitive conditions in vector $A_2$ it would be impossible to find a testwise condition pair which would fall into groups 1 and 4 of FIG. 14. Without the fault insensitive inputs, the remaining input pairs would be 00 which occurs only in groups 2 and 3 which previously was the case in the test 1 pair, and the remaining testwise condition pair for tests 3 and 4 being 11, which are not found in groups 1 or 4. Thus it can be seen that without the fault insensitive conditions in vector $A_2$ it would be impossible to find vector $A_2$ separable from the normal output vector.

In the synthesis procedure to this point the test procedure was produced by first selecting output vector pairs for the various input faults and then by referring to the table of FIG. 7 to establish the test procedure. This method of synthesis was relatively uncomplicated since only a four input circuit was being considered, however, the same synthesis method would become almost prohibitive timewise if a ten or more input circuit were to be tested. A second approach for finding a test procedure would be to follow the above mentioned first and second conditions, that the normal output vector have at least one logic 0 and one logic 1 and that each input vector has one logic 0 and one logic 1, and initially establish arbitrarily the vectors for the test procedure and the normal case. Then when checking that each input vector is separable from the normal output vector and that each input vector is separable from the other input vectors it might become necessary to change some logic one's to logic zero's or vice versa and add fault insensitive conditions into some of the input vectors in order to meet the separability requirements. Once the necessary fault insensitive inputs are established in order to meet the separability requirements, then by a procedure which will be outlined subsequently, the output vectors for the various input faults may be determined.

The remaining requirement when using either of the above synthesis procedures, where the output vector pairs for the various input faults were selected from the table of permissible output vectors or where the input vectors of the test procedures were arbitrarily chosen and any required fault insensitive inputs established or inputs changed, is to determine that a Karnaugh map without conflicts or a distance diagram with certain constraints exists. In the present illustration concerning the table of FIG. 10, it was previously determined that the output vector pairs for the various input faults did in fact yield a Karnaugh map without conflicts. This was illustrated by the plot in FIG. 11.

As an alternative to drawing a Karnaugh map of the output vectors for the various input faults to determine if a conflict exists, the fifth test condition may be performed by plotting a distance diagram of the test procedure under consideration. In the distance diagram two test at a time will be compared. The distance between these two tests, i.e., the count of the number of inputs having different input conditions for the two tests is of concern. FIG. 15 is the distance diagram for the test procedure of FIG. 13. First it should be noted that there is a node for each of the four tests, each node having adjacent thereto a parenthetical designation of the respective test number. The numbers adjacent the line segment connecting two tests under consideration indicates the distance between those tests. For example, the distance between test 1 and 2 is equal to 2 as indicated by FIG. 15. Comparing the inputs to $A_1$ through $A_4$ for tests 1 and 2 reveals that the respective inputs differ for only $A_1$ and $A_4$, thus the distance between the two tests is equal to 2. The distance between test 2 and test 3 is equal to 3 since the inputs differ at $A_1$, $A_2$ and $A_4$. For the purpose of constructing the distance diagram, the presence of a fault insensitive input is ignored. For example, it can be seen that the distance between tests 3 and 4 is equal to 2 since the inputs differ only in the case of $A_3$ and $A_4$. By following the procedure outlined above it will further be seen that the distance between tests 1 and 3 is equal to 1, the distance between tests 1 and 4 is equal to 3 and the distance between tests 2 and 4 is also equal to 3. If all of the distances in the distance diagram of a test procedure under consideration are greater than 2, then a function exists (and condition 5 has been satisfied). If the distance between any two tests is equal to 2, then the input conditions at the inputs which are responsible for the distance 2 must correspond to one of the four possibilities of the appropriate output column of FIG. 16. The table of FIG. 16 is divided generally into two portions, one being devoted to the situation wherein the normal outputs for the two tests are the same, i.e., both 0 or both 1 and the second portion of the table being devoted to the situation wherein the normal outputs are not alike, the 0 and 1 situation. The table further includes four rows in which the various test input possibilities are set out for the equal and unequal normal output situation, these rows including the $A_i$ and $A_j$ input pairs. The input possibilities consist of four rows of various input combinations of fault insensitive and true and not true situations. To illustrate the use of table 16 in evaluating the test procedure of FIG. 13, it will be demonstrated that the input conditions responsible for the distance equal to 2 between tests 1 and 2 fall within one of the four possibilities of FIG. 16. First it should be noted that since the normal outputs for test 1 and 2 are both 0's, then the left hand column wherein the output vectors are the same is applicable. In tests 1 and 2 the inputs responsible for the distance 2 are of course under $A_1$ and $A_4$, both having the 01 combination. In the input condition column of FIG. 16 corresponding to equivalent normal outputs, it will be noted that in possibility 4 there exists the situation in column $A_i$ of a first pair of inputs $\overline{\alpha_i}\alpha_i$ and in the column $A_j$ a second pair of inputs $\overline{\alpha_j}\alpha_j$, which corresponds to the present situation. Thus it can be seen that even though the distance between the first and second tests was equal to 2, since the input combination responsible for the distance 2 appears in one of the four possibilities of FIG. 16, then no conflicts occur for the test 1 and test 2 combination. $\alpha_i$ is not necessarily equal to $\alpha_j$ since $\alpha_i$ and $\alpha_j$ are independent of each other.

There is also a distance of 2 between test No. 3 and test No. 4, the pairs responsible for the distance 2 being under column $A_3$ a 0, 1 and under column $A_4$ 0, 1. It will be noted that the normal output for tests 3 and 4 in this case are both equal to 1. This is a similar situation to that encountered with respect to tests 1 and 2, differing only in that the normal outputs are both ones, whereas the normal outputs for test 1 and 2 are both zeros. This difference does not change the analysis since in both instances the normal outputs are the same. Thus the distance 2 between tests 3 and 4 falls within possibility 4 of FIG. 16 and therefore no problem is involved with a conflict between tests 3 and 4. At this point it should be noted that although the fault insensitive designation for the various inputs was ignored when constructing the distance diagram, when analyzing the tests having a distance equal to 2 to determine whether or not the tests will fit within one of the four possibilities of FIG. 16, it may be necessary to consider the fault insensitive condition for the inputs in order to fit the input combinations within one of the four possibilities. Thus one must be careful not to confuse the insignificance of the fault insensitive inputs when constructing a distance diagram and considering them for the purpose of determining whether or not a conflict is involved between the two tests when referring to FIG. 16.

Next the situation where the distance between two tests is equal to 1 must be considered. When this occurs, the elements of the input vectors for the tests producing the distance 1 must correspond to the one of the two situations of FIG. 17. In FIG. 17 it will be noted that the table is divided into two columns, the left hand column corresponding to the situation in which the normal outputs are equal, and the right hand column corresponding to the situation in which the normal outputs are not equal. In the distance diagram of FIG. 15 it will be noted that the distance between tests 1 and 3 is equal to 1, this being produced by the input combination under column $A_2$ in FIG. 13 and that the normal outputs for the corresponding tests 1 and 3 are 0 and 1 respectively. Referring to FIG. 17, note that this combination falls within the right hand column of the figure wherein the output conditions for the normal output are unlike. As was true in the analysis of the distance diagram wherein the distance between two tests was equal to 2, when determining whether a distance of 1 between tests is permissible, it is also necessary to consider the fault insensitive conditions at the inputs when referring to the possibilities in FIG. 17. Note that in the distance equal to 1 situation, when both of the normal outputs are equal, the inputs responsible for the distance one must both be fault insensitive.

Thus it has been shown that by using the distance diagram and meeting the constraints of FIGS. 16 and 17 with respect to those distances which were equal to 2 and 1 respectively, the function exists without constructing a Karnaugh map to determine whether or not there was a conflict produced by the tests. It will be appreciated that the use of the distance diagram with the constraints pointed out with respect to the distances equal to 2 and 1 is considerably less complicated than constructing a Karnaugh map when the number of tests and the number of inputs is quite large. Now that it has been established that the test procedure meets the five conditions which were previously set out, then the test procedure will isolate an input failure to a single bus or indicate that the output of our testing circuit is either stuck at one or stuck at zero.

If one arbitrarily selects the input vectors and the normal output vector, and finds that the aforementioned five requirements for the input vectors and the normal output vector are met, then the output vectors for the various input fault possibilities must be written. This task is relatively straightforward, with the exception of the inputs which are fault insensitive.

It will now be demonstrated how the output vector for the various input faults for test No. 1 of FIG. 13 may be ascertained by using only the test procedure and the normal outputs. In test No. 1 the input to $A_1$ is zero and the expected normal output is also zero. From this one would conclude that if the input $a_1$ is stuck at zero then the testing circuit would be receiving the same input as though the input to $A_1$ of zero were being applied in the normal situation and consequently under the $a_1$ stuck at zero column for that test a 0 would be written. In the case of $a_1$ s-a-1, the test circuit would be receiving a non-normal input and consequently the output would be non-normal, or 1 which would be placed under the designation $a_1$ s-a-1. In a similar manner the input to lead $A_2$ in test 1 is again zero and if the lead $a_2$ were in fact s-a-0 the test circuit would be seeing the input as though the normal test input were being applied and consequently a normal output of 0 would result, therefore under the output vector for $a_2$ s-a-0 in test 1, a 0 would be inserted. If the lead $a_2$ were stuck at 1, the test circuit would be receiving an unexpected input and thus the output would be non-normal, or in this case a 1. Now consider test No. 2 of the test procedure of FIG. 13 and in particular the input to $A_1$ which is a 1. With an input of 1 the normal output from the test circuit would be a 0, and consequently if the lead $a_1$ were stuck at 1, the test circuit would be seeing what would be the normal input for the test. Therefore, under the $a_1$ s-a-1 the normal output, which in this case is a 0, would be inscribed. If the lead $a_1$ were stuck at zero, a nonnormal input to the test circuit, then the output from the test circuit would be non-normal, or a 1. From the foregoing it can be seen that if the test input to a particular lead corresponds to the condition at which the input to the test circuit is stuck, then the output of the test circuit for the stuck condition will correspond to the normal output for the test circuit. And correspondingly if the test input to the lead is different from the stuck condition at the input to the test circuit, then the output condition from the test circuit would be different from the normal expected output unless the input is fault insensitive for that test. From the foregoing it can be seen that the output vectors for the various input faults may be quickly written when considering the condition of the test input to the lead, the normal output expected and the stuck condition which the test circuit is seeing. The final situation involved in the test procedure, not resolved to this point, is what occurs when an input in the test procedure is designated fault insensitive. For example in test No. 2 the input to lead $A_2$ is a zero and this input, as noted from FIG. 13, is fault insensitive. When a fault insensitive input occurs in the test procedure, the resulting output from the test circuit will be normal whether the input to the test circuit is stuck at 0 or 1. Hence the term fault insensitive is used to designate the test input since regardless of the fault condition at the lead in question, the output will be normal. Thus it will be noted that the outputs for $a_2$ s-a-0 and $a_2$ s-a-1 in test number 2 are both zero which corresponds to the normal output for test No. 1. In like manner the input to $A_2$ in test No. 4 is a 1 and is fault insensitive, thus the normal output of a 1 will be the output from the test circuit for $a_2$ s-a-1. Thus it can be seen that by simply referring to the test procedure and the corresponding normal output vector, the output vectors for the various input faults may be ascertained without going through the cumbersome task of selecting pairs of output vectors from a table as illustrated previously.

Figure 18:
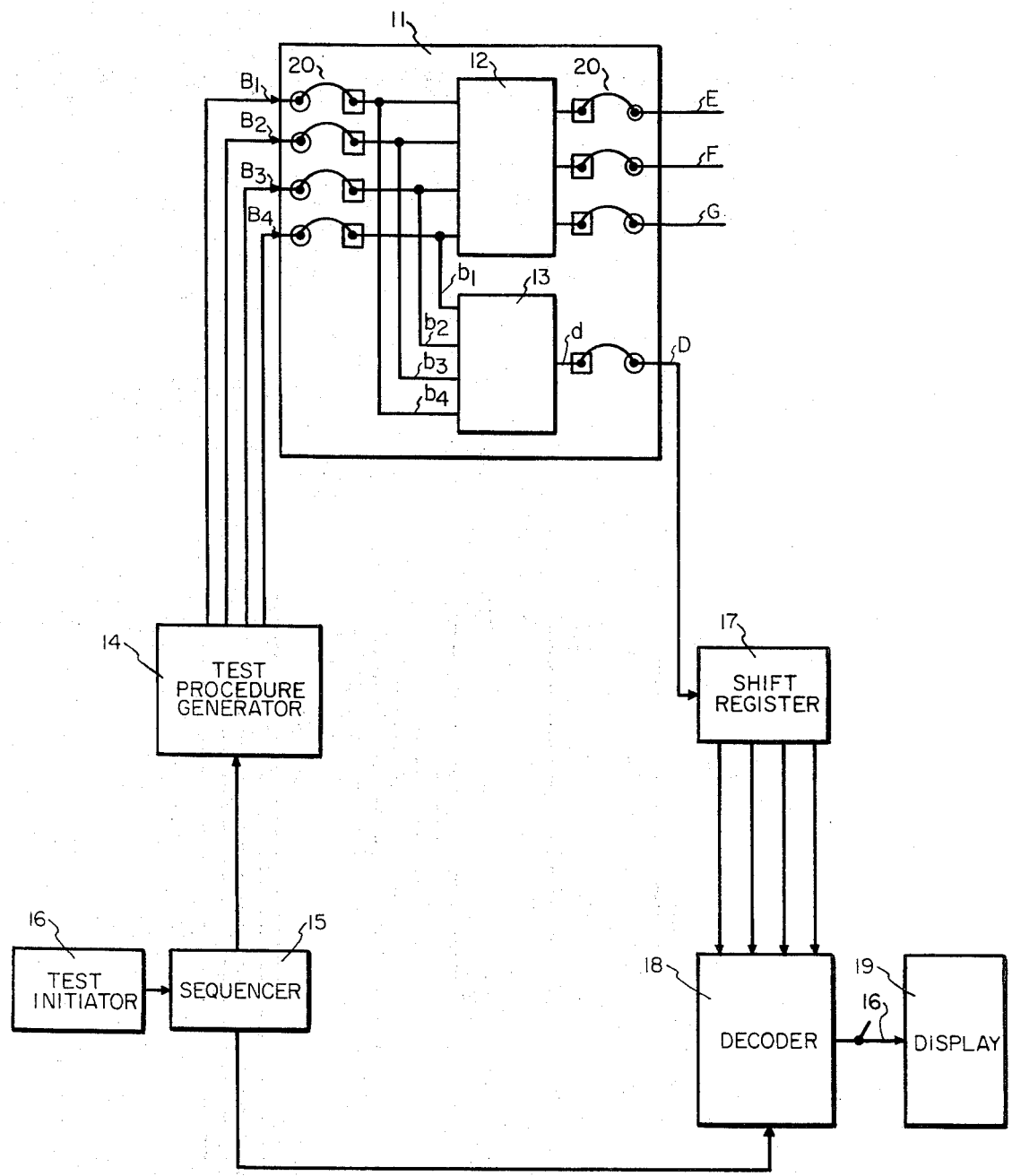
FIG. 18 is a block diagram of a testing arrangement used in conjunction with the specialized testing circuit 13 to isolate possible faults at any one of the four inputs to least replaceable unit 11 or to the one output of specialized testing circuit 13.

Now referring to FIG. 18, there is shown a set-up which is desirable for applying the techniques described previously. In this arrangement least replaceable unit 11, having four external inputs designated $B_1$, $B_2$, $B_3$, $B_4$ which are connected by bonding leads 20 to the circuit under test designated herein as 12 and having a testing circuit 13 connected thereto is included with several other devices which are useful for testing least replaceable unit 11. Since least replaceable unit 11 has four inputs it is possible to use the test procedure previously generated and which is shown in FIG. 13 since the test procedure is not dependent upon the characteristics of circuit 12 for its operation. Test procedure generator 14 is used to sequentially produce the required four tests which are applied to the inputs of least replaceable unit 11. The sequence of operation for testing least replaceable unit 11 is as follows. First the test initiator 16 is energized which triggers the sequencer 15; one output of the sequencer starts the test procedure generator which applies the four tests to the least replaceable unit 11 and the other output from the sequencer, which is applied to the decoder 18, clears the decoder and prepares it to receive outputs from the shift register 17. Upon receipt of a signal from the sequencer, test procedure generator 14 will begin applying the four tests, one at a time, to the least replaceable unit 11, each test resulting in a single output from testing circuit 13. This output is then fed to shift register 17, and stored there until the four tests have been completed. Upon completion of the four tests, shift register 17 feeds the resulting output of these four tests to the decoder 18 which compares the test output with the sixteen possible combinations which could result from the four test outputs and the result of the comparison is fed to display unit 19 to indicate the results of the tests. Under the possible fault assumptions set forth previously, there is a possibility of eleven unique output vectors. However if, for example, there is a double fault situation in least replaceable unit 11, then this will result in an output vector which is different from any of the eleven vectors which would be expected. Test initiator 16 may take the form of merely a pushbutton switch which would be activated as required to start the test procedure, or alternatively might be a clock pulse generator set to test the least replaceable unit 11 at predetermined intervals. And of course it will be appreciated that the test procedure generator could be programmed with a multiple of test procedures.

Although it has been demonstrated herein how this special testing method and arrangement therefor has unique application in integrated circuit technology, it will be appreciated by those skilled in the art that many other applications of the techniques disclosed are possible.

I claim:

1. A fault detection arragement for n circuit paths, each extending from a first point to a second point, comprising:
    means for applying a predetermined set of tests to said paths at said first point;
    a testing circuit having an input individual to each of said n circuit paths and one output;
    means for connecting each input of said testing circuit to its corresponding circuit path at said second point;
    means for storing an output pattern corresponding to a no circuit fault condition; and
    means for comparing the output pattern from said one output resulting from the application of said predetermined set of tests with said output pattern corresponding to a no circuit fault condition, a disagreement therebetween indicating a faulty circuit path.

2. The fault detection arrangement of claim 1 wherein each test of said set of tests includes n binary inputs, one for each of said n circuit paths, and the application of each of said tests to said circuit paths at said first point results in a single binary output from said testing circuit.

3. The fault detection arrangement of claim 2 wherein said binary inputs of each said test are simultaneously applied to their corresponding circuit paths at said first point.

4. A fault isolation arrangement for *n* circuit paths, each extending from a first point to a second point, comprising:
- means for applying a predetermined set of tests to said paths at said first point;
- a testing circuit having an input individual to each of said n circuit paths and one output;
- means for connecting each input of said testing circuit to its corresponding circuit path at said second point;
- means for storing output patterns corresponding to the no fault condition, and to possible fault conditions on each of said n paths and said one output; and
- means for comparing the output pattern from said one output resulting from the application of said predetermined set of tests to said paths at said first point with said output patterns corresponding to said no fault and possible fault conditions to ascertain the presence of a fault and to isolate any existing fault corresponding to said possible fault conditions.

5. The fault isolation arrangement of claim 4 wherein each test of said set of tests includes n binary inputs, one for each of said n circuit paths, and the application of each of said tests to said circuit paths at said first point results in a single binary output from said testing circuit.

6. The fault isolation arrangement of claim 5 wherein said n binary inputs of each said test are simultaneously applied to their corresponding circuit paths at said first point.

7. The fault isolation arrangement as claimed in claim 4 wherein the minimum number of tests P required to isolate a failure to any one of said n-inputs is expressed by the relationship:

$$2^{P-2} - 1 \leq n \leq 2^{P-1} - 2.$$

8. In an integrated circuit assembly having a circuit chip including terminal pads, external terminals and bonding leads for connecting said external terminals to said terminal pads, a testing circuit for detecting electrical faults between predetermined ones of said external terminals and their corresponding terminal pads, said testing circuit having an input individual to each of said corresponding terminal pads and an output, and said testing circuit representing a function derived from a test procedure having a normal output vector including at least one logic one and one logic zero, and a set of input vectors, each of said input vectors having at least one logic one and one logic zero.

9. In an integrated circuit assembly having a circuit chip including terminal pads, external terminals and bonding leads for connecting said external terminals to said terminal pads, a testing circuit for isolating electrical faults occurring between predetermined ones of said external terminals and their corresponding terminal pads, said testing circuit having an input individual to each of said corresponding terminal pads and an output, and said testing circuit representing a function derived from a test procedure having a normal output vector including at least one logic one and one logic zero, and a set of separable input vectors, each of said input vectors including at least one logic one and one logic zero, and each of said input vectors being separable from said normal output vector.

* * * * *

UNITED STATES PATENT OFFICE
CERTIFICATE OF CORRECTION

Patent No. 3,777,129   Dated December 4, 1973

Inventor(s) MADHUKUMAR A. MEHTA

It is certified that error appears in the above-identified patent and that said Letters Patent are hereby corrected as shown below:

On the Cover Page: [75] Change "Mehia" to read -- Mehta --

Signed and sealed this 9th day of April 1974.

(SEAL)
Attest:

EDWARD M. FLETCHER, JR.
Attesting Officer

C. MARSHALL DANN
Commissioner of Patents